United States Patent Office 3,687,833
Patented Aug. 29, 1972

3,687,833
PURIFICATION OF LACTOGEN
Alan Parcells and Donald A. Dahlgren, Portage, Mich., assignors to The Upjohn Company, Kalamazoo, Mich.
No Drawing. Filed Mar. 10, 1969, Ser. No. 805,789
Int. Cl. A61k *17/00;* B01k *5/00;* C07g *15/00*
U.S. Cl. 204—180 G
1 Claim

ABSTRACT OF THE DISCLOSURE

Human placental lactogen (also known as HPL) is purified by (1) water-miscible organic solvent fractionation and (2) electrophoresis in polyacrylamide gel using a discontinuous buffer system. A more potent product is obtained as determined by immunological and biological criteria.

BACKGROUND OF THE INVENTION

A human placental lactogenic factor or principle is described by Higashi, Endocrinology, Jap. 8: 279–287 (1961) and 288–296 (1961) and also in Endocrinology Jap. 9: 1–11 (1962). Earlier Ito and Higashi had reported on the finding of such a material in human placenta. J. Pharm. Society Japan 73:89. Subsequently it was reported that human placental lactogen preparations potentiated the biological activity of human growth hormones, Josimovich, Endocrinology 78: 707–714 (April 1966). The further purification and characterization of a placental protein with immunological similarity to human growth hormone is described by Friesen, Nature 12:14 (Dec. 18, 1965). There in a lactogenic effect is obtained with 500 micrograms of the placental lactogenic protein. A like effect in rabbits is described by Chadwick, J. Endocrinology 27:253 (1963) wherein at a dose of 50 to 75 international units of Prolactin lactogenic effects in rabbits are brought about.

SUMMARY OF THE INVENTION

The presently improved process of this invention makes it possible to eliminate interfering and contaminating materials from relatively crude human placental lactogen thus providing a physico-chemically purified substance of high specific potency. The improved process consists essentially in removal of undesirable impurities from human placental lactogen of art origin by acetone fractionation followed by electrophoresis on an inert supporting medium in a discontinuous aqueous buffer system. The present process obviates extensive and prolonged equilibration of media such as the art-used ion exchange materials which usually require tedious sequential obtainment of new equilibrium conditions as different sequential eluants are employed. Moreover, reuse of such ion exchange material and its prolonged contact with aqueous solutions under the usually nonsterile conditions allows microbial growth and contamination with ensuing loss of the active lactogen.

DESCRIPTION OF PREFERRED EMBODIMENTS

According to the manner and process of carrying out this invention, there occurs facile separation of immunologically and biologically active material from inert or less active material. Purification is obtained rapidly and does not require an extensive equilibration or generation time or a complicated programming of buffer solution gradients. Moreover, use of freshly cast gel prevents the possibility of inactivation of proteins by mold contaminants which arise in ion exchange column methods.

Generally speaking the present invention consists essentially of providing an aqueous solution of starting crude HPL having a pH of from about 5 to about 6 preferably pH 5.5. Acetone or a lower alkanol is added slowly to give a concentration range of from about 17 to about 25%, preferably 20% v./v. to cause the precipitation of an insoluble relatively impure fraction of a reddish brown color. Free of this precipitate, the soluble portion at this concentration of acetone is raised to an acetone concentration of from about 35 to about 55 percent, preferably 50 percent to bring about the precipitation of the human placental lactogen. The precipitate is separated as by centrifugation and dissolved in a minimum amount of mildly alkaline water at a pH of from about 7 to about 9.5, preferably from about 8 to about 8.6. Preferably this alkaline solution is concentrated for the electrophoresis in a discontinuous buffer system. Concentration, for example, can be by placing the solution in a dialysis sac and concentrating by a combination of pervaporation and packing the sac in dry granular sucrose. The alkanols are methanol, ethanol and isopropanol.

The supporting medium for the electrophoresis in the discontinuous aqueous buffer system is a cross-linked polyacrylamide gel. Illustrative gels are formed by copolymerization of acrylamide (5% in aqueous solution) and 3 mol percent of N,N'-methylene bisacrylamide with activated ammonium persulfate in the absence of air. Raymond et al., Anal. Biochem 1:391–396 (1960); Science, 130:711 (1959); Ornstein and Davis, Preprint by Distillation Products Industries, Division of Eastman Kodak Co., Rochester, N.Y., 1962 and Davis, Gel Electrophoresis, Annals New York Academy Sciences, volume 121, Art. 2, pages 404–427, Dec. 28, 1964. The discontinuous aqueous buffer solution utilizes (tris-hydroxymethylamino methane)-maleate, (tris-hydroxymethylamino methane)-glycine, or (tris-hydroxymethylamino methane)-hydrochloric acid or sodium barbital-barbituric acid, with ionic concentrations ranging from 0.037 molar to 0.01 molar. At these pH conditions the negative pole of current source is in the buffer above the gel and migration is downward longitudinally of the gel column. The pH of the separation varies from about 7.5 to about 9.5. A running time of 4 to 6 hours suffices for electrophoresis utilizing polyacrylamide gel. For a 2″ diameter polyacrylamide gel operable parameters are a sample volume of 1 to 4 milliliters containing 50–300 mg. of soluble material. The height of the gel is preferably from about 3 to about 7 centimeters and the amount of cross-linking of the gel is from about 2 to about 7 percent, especially 3 percent. The concentration of the cross-linked polyacrylamide in the gel is from 3% to 7%, preferably about 3.0%. Discontinuous electrophoresis in polyacrylamide gel is described by Williams Reisgeld, Gel Electrophoresis, Annals N.Y. Acad. Sci., vol. 121, Art. 2, p. 373 (1964).

A low operating temperature, preferably about 4° C., within the range of from about 0° C. to about 10° C. is used in carrying out the present inventive process.

Potency during processing and of the final fraction is assayed by a quantitative complement fixation method being a modification of the method of Tashjian et al., Endocrinology 74:244 (1964). A purified human growth hormone with Freund's adjuvant is injected into rabbit foot pads. Seven to ten days later the growth hormone is injected subcutaneously and three weeks later intravenously. Antiserum to the growth hormone is collected seven days later. The product of this process is immuno-Josimovich and MacLaren, loc. cit.) and the above antiserum is therefore used in complement fixation assays for human placental lactogenic factor. Increased potency is shown by decreased amounts of lactogen required to give 50% inhibition of complement fixation.

Starting material to be utilized in the present process is obtained by methods available in the art, for example, Josimovich and MacLaren Endocrinology 71, 209 (1962) and references set forth therein. Illustratively, starting material is made from "B-Store Paste" which is the residue left after precipitates II and III of the Cohn Method 6 of blood fractionation (Laurence E. Strong in Encyclopedia of Chemical Technology, vol. 3, p. 587, 2nd edition, Interscience, New York) is extracted with 6 to 8 percent methanol at pH 7 to remove gamma globulins. So extracted, "B-Store Paste" is extracted further with deionized water or with water brought to pH 10.5 with calcium oxide and undissolved material is removed. This aqueous extract is adjusted as required, to about pH 6.4, and any insoluble material is removed. The soluble portion is adjusted to pH 5.5 with 1 N hydrochloric acid and sufficient ammonium sulfate is added to bring the solution to half saturation. After several hours at refrigerated temperature (about 4° C.) the precipitate is harvested by centrifugation and washed with half-saturated ammonium sulfate solution. Resolution of the precipitate in a minimal amount of water and adjustment to pH 5.5 is followed by addition of an equal volume of 35.6% (v./v.) ethanol to yield a precipitated HPL which is dissolved in water to provide suitable starting material for this process. Illustratively, one kg. of "B-Store Paste" is extracted with four liters of chilled deionized water by mixing and standing overnight at a temperature of about 4° C. Undissolved material is removed by centrifugation. The pH of the supernatant 6.3 is adjusted to pH 5.5 by dropwise addition of 1 N hydrochloric acid. Insoluble material is removed by filtration, the filtrate is brought to one half saturation with respect to ammonium sulfate and the resulting precipitate allowed to form overnight. It is recovered by centrifugation and redissolved in 480 milliliters of pH 10 water. The pH is adjusted back to 5.5 and insoluble material is removed by centrifugation. An equal volume of 35.6% (v./v.) chilled ethanol is added with vigorous stirring. After overnight standing the precipitated HPL is recovered and redissolved in 100 milliliters pH 10 water. The pH is adjusted back to 5.5 and the resulting brown precipitate is removed by centrifugation and discarded to yield an aqueous solution of crude HPL as a starting material. Further illustrating the preparation of starting material, 500 gms. of "B-Store Paste" is extracted for five minutes with 1.5 liters of water, brought to pH 10.5 by the addition of calcium hydroxide. Undissolved material is removed by centrifugation. The pH of the supernatant, 5.4, is raised to 6.4 by the addition of 1 N sodium hydroxide. The precipitate is removed by centrifugation and the pH of the supernatant is readjusted to 5.5 with 1 N hydrochloric acid. Sufficient solid ammonium sulfate is added to bring the solution to one half saturation. After overnight standing the precipitate is collected by centrifugation and washed once in cold half saturated ammonium sulfate solution. The precipitate is redissolved in about 125 milliliters of water at pH 5.5. An equal volume of 35.6% ethanol is added and after four hours standing the precipitate is recovered by centrifugation and redissolved in 100 milliliters of water at pH 5.5 to yield an aqueous solution of crude HPL as starting materials.

Another source of material for the present process is human placental pulp which is obtained from human placenta by expressing and removing as much as possible of the blood. Generally this human placental pulp is extracted with water to yield an aqueous solution from which impurities are removed by precipitating an insoluble portion at pH 6.4. From the soluble portion at this pH crude HPL is precipitated by half saturated ammonium sulfate at pH 5.5. The precipitate is redissolved at a pH of from about 8 to about 10 and an insoluble portion is precipitated therefrom by lowering the pH to about 5.5. The soluble portion at this pH is precipitated by the addition of an equal volume of 36.5% ethanol (v./v.) to yield a precipitated HPL which is dissolved in water to provide starting material. Illustratively 2 kg. of placental pulp is extracted in 500 gm. portions using the total of 2 liters of chilled water brought to pH 10 with calcium hydroxide. Undissolved solids are discarded and the supernatant liquid brought to pH 6.4. After overnight settling the bulk of the clear, red-colored supernatant is poured out and the solids are removed by centrifugation of the remaining aqueous phase. The combined supernatants are brought to pH 5.5 and the solids are allowed to settle overnight. A combination of decantation and centrifugation is employed to remove these solids. The supernatant is then brought to 50 percent saturation with respect to ammonium sulfate and after overnight standing the bulk of the supernatant is recovered by decantation and centrifugation to yield precipitated HPL. The HPL is dissolved in 560 milliliters of water and insoluble material at pH 5.5 is removed by centrifugation. An equal volume of 35.6% ethanol is added slowly to the supernatant and the precipitated HPL is recovered at the centrifuge and redissolved to 250 milliliters of water at pH 9.5. The pH is subsequently lowered to pH 5.5 and insoluble contaminants are removed by centrifugation to yield an aqueous solution of crude HPL as starting material. Likewise, further additional starting material may be prepared from placental pulp as follows: 60 gms. of partially purified HPL from frozen placental pulp (Josimovich and MacLaren supra) is further purified by being dissolved in 1.5 l. of pH 9.9. bicarbonate carbonate buffer. The pH is successively adjusted to pH 6.4, 4.5 and 5.5; any precipitates forming at these values being removed by centrifugation. The supernatant at pH 5.5 is brought to 0.5 saturation with respect to ammonium sulfate, allowed to stand overnight in the cold and centrifuged for recovery of the precipitate. The precipitate is redissolved in a minimal volume of water at pH 8.5. Thereafter additional insoluble material is again removed at pH 6.4 and HPL is again precipitated at 5.5 with half saturated ammonium sulfate. The precipitate is dialyzed free of salt and freeze-dried to yield 18 gms. This material is subsequently redissolved and HPL precipitated therefrom at an ethanol concentration of 17.7 percent. This precipitated HPL is suitable as starting material for the present process when dissolved in a minimal amount of water at pH 5.5.

The following examples are of the manner and process of using the present invention.

EXAMPLE 1

100 ml. of solution of crude HPL prepared from 1 kg. of "B-Store Paste" is used at a pH 5.5. This solution is brought to 20% (v./v.) concentration of acetone by slow addition of cold acetone. The next day the precipitate is removed by centrifugation and the 20% acetone solution is adjusted to 50% acetone concentration to yield a precipitate of partially purified HPL. After overnight standing at a temperature of about 4° C., the precipitate is recovered and redissolved in approximately 80 milliliters of water at pH 5.5. This solution is transferred to a dialysis sac and concentrated by a combination of pervaporation and packing the sac in dry granular sucrose. When the volume of the HPL solution is reduced to 4 milliliters, it is placed on a 3 percent cross-linked polyacrylamide gel column (5 centimeters in diameter by 7 centimeters in length). Electrophoresis is commenced at 300 volts 50 ma. using a run time of 4 hours at a temperature of about 4° C. Migrating components are washed from the bottom of the gel with fresh 0.1 molar trisglycine buffer, pH 9.2 into a fraction collector which is set to collect 10 milliliter samples. Variations in protein content are monitored by optical density measurements at 280 m$\mu$. Appropriate tube contents are pooled, dialyzed and freeze-dried. The following yields and immunological potencies are obtained.

| Fraction number | Yield (mg.) | Immunological potency ($\mu$g. to inhibit) |
| --- | --- | --- |
| −149.1 | 58 | 0.06 |
| −149.2 | 62 | >1 |
| −149.3 | 100 | >1 |
| Human growth hormone standard. | | 0.08 |

EXAMPLE 2

250 ml. at pH 5.5 containing crude HPL (2 gm. placental pulp) is brought to 20 percent acetone concentration (v./v.) by slow addition of chilled acetone. The resulting precipitate is collected at the centrifuge and discarded and the soluble portion is brought to acetone concentration of 50% (v./v.). After overnight standing the insoluble HPL is recovered at the centrifuge and dialyzed to remove acetone and salts. During this dialysis a small amount of a colored precipitate is formed in the sac and is removed by centrifugation. The supernatant is concentrated by dialysis against granulated sucrose to a volume of 2.7 milliliters, and this protein solution is treated by electrophoresis on polyacrylamide gel. Electrophoresis is carried out in a 5 centimeter diameter by 7 centimeter height column of 3 percent cross-linked polyacrylamide gel at pH 9.2. Separation proceeds for four hours at 300 volts and 50 ma. During this time the migrating components are eluted from the bottom of the column by fresh 0.1 molar tris-glycine buffer, pH 9.2 and conveyed to a fraction collector. Ten milliliter fractions are taken with ultraviolet spectrophotometric readings at 280 m$\mu$ being used to detect protein components. Suitable tube contents are pooled, dialyzed and freeze-dried to powders to yield the following fractions and activities:

| Preparation | Yield (mg.) | Immunological potency ($\mu$g. to inhibit) |
| --- | --- | --- |
| −138.1 | 3 | >1.0 |
| −138.2 | 17 | 0.09 |
| −138.3 | 23 | 0.08 |
| −138.4 | 37 | >1.0 |
| −138.5 | 38 | >1.0 |
| Human growth hormone standard | | 0.06 |

EXAMPLE 3

100 ml., pH 5.5 of crude human placental lactogen (500 gm. "paste") sufficient acetone is added to bring the solution to 20 percent concentration v./v., after standing overnight at a temperature of about 4° C. the insoluble fraction is easily removed by centrifugation. Thereafter the clear supernatant is raised by to 50% acetone concentration, the resulting precipitate is recovered by centrifugation and then dialyzed to remove salts and acetone. The yield of freeze-dried powder is 62 mg. Fifty milligrams of this material is dissolved in 2 milliliters of 6 molar urea and the solution is carefully applied to the column of three percent polyacrylamide gel for electrophoresis. The gel used in this electrophoresis is formed by mixing 3 ml. of solution I (acrylamide 20 gms.; bisacrylamide 0.6 gm.; water, q.s. to 100 milliliters); 7 ml. of solution II (N,N,N',N'-tetramethylene diamine 1 ml.; 0.02 M tris-glycine buffer pH 9.5 99 ml.) and 10 ml. of solution III (ammonium persulfate 0.2 gm.; water q.s. ad 100 ml.). The mixed solution is used to cast a cylinder 7 centimeters in height by 5 centimeters in diameter and electrophoresis is carried out for five hours at a potential of 275 volts and 75 ma. current. During this time the lower surface of the gel cylinder is continuaully swept with fresh, pH 9.2-tris-glycine buffer, 0.09 M. The effluent is directed to a fraction collector for collection of 10 ml. fractions at a flow rate of 400 ml. per hour. Protein fractions are detected as heretofore by measurement of optical density at 280 m$\mu$. Collections in the following tubes are pooled for determination of immunological potencies by complement-fixation inhibition.

| Tube numbers | $\mu$g. to inhibit |
| --- | --- |
| 22–27 | 0.05 |
| 28–40 | 4.5 |
| 41–90 | >5.0 |
| Control of human growth hormone | 0.03 |

EXAMPLE 4

An aqueous solution at pH 5.5 of crude human placental lactogen is brought to a concentration of 20 percent acetone and the resulting precipitate is removed by centrifugation and discarded. The clear supernatant is brought to 50 percent acetone concentration to a precipitate of the HPL. Dialysis to remove salts and acetone followed by freeze-drying yields 4.4 gms. of partially purified HPL. 1.5 gm. of this material is dissolved in 20 ml. of an aqueous urea solution and the resulting solution is carefully layered onto a column of 3 percent cross-linked polyacrylamide gel, formed from the reagents described in above Example 3. The dimensions of the column are 11.4 centimeters in height and 5 centimeters in diameter. A potential of 180 volts and a current of 130 ma. are applied for 6 hours. During this time the migrating components are swept from the bottom of the gel cylinder by a flow of 0.1 molar tris-glycine buffer, pH 9.1, into a fraction collector as described supra. Appropriate tubes by density of protein measurements are pooled and the resulting fractions are dialyzed and freeze-dried. Repetition of the process twice yields from the total of 4.4 gms., 810 mg. of purified human placental lactogen. Assays by the body weight gain method of Parlow et al. Endocrinology 77:1126 (1965) gave the following results after 8 days.

| Preparation | Total dose/rat | $\Delta$body weight (gm.) |
| --- | --- | --- |
| Saline control | | 0.79±0.19 |
| NIH growth hormone | 192 $\mu$g | 10.86±1.67 |
| Do | 48 $\mu$g | 3.43±1.42 |
| HPL | 80 mg | 5.93±1.61 |

I claim:
1. A process of purifying human placental lactogen which consists essentially of:

(1) providing an aqueous solution containing human placental lactogen at a pH of from about 5 to about 6;

(2) precipitating therefrom an insoluble fraction at an acetone concentration of from about 17 percent to about 25 percent v./v. and separating said fraction from the soluble portion;

(3) precipitating from said soluble portion an insoluble precipitate at an acetone concentration of from about 35 percent to about 55 percent v./v. and separating said precipitate from the soluble fraction;

(4) dissolving said precipitate in an aqueous solution at a pH of from about 7 to about 9.5; and (5) in an inert supporting medium of cross-linked polyacrylamide gel and a discontinuous aqueous buffer system electrophoretically separating the aqueous solution into fractions of varying immunological and biological activities, and separately eluting by sweeping the end of the gel with a buffered solution and recovering said fractions.

References Cited

UNITED STATES PATENTS 3,409,605  11/1968  Florini _____ 260—112 R

OTHER REFERENCES

Ferris et al., Blood, vol. 19, No. 4, pp. 479–481 April 1962.

F. C. EDMUNDSON, Primary Examiner

U.S. Cl. X.R.

260—112 R